(12) United States Patent
Fraas

(10) Patent No.: US 8,581,090 B1
(45) Date of Patent: Nov. 12, 2013

(54) FUEL FIRED THERMOPHOTOVOLTAIC (TPV) CYLINDRICAL POWER SUPPLY AND BATTERY REPLACEMENT WITH CATALYTIC MATCHED EMITTER OR POST IR EMITTER ARRAY

(75) Inventor: Lewis M. Fraas, Issaquah, WA (US)

(73) Assignee: JX Crystals Inc., Issaquah, WA (US)

( * ) Notice: Subject to any disclaimer, the term of this patent is extended or adjusted under 35 U.S.C. 154(b) by 151 days.

(21) Appl. No.: 13/108,258

(22) Filed: May 16, 2011

Related U.S. Application Data

(60) Provisional application No. 61/395,618, filed on May 14, 2010, provisional application No. 61/395,715, filed on May 17, 2010, provisional application No. 61/402,761, filed on Sep. 3, 2010.

(51) Int. Cl.
| | | |
|---|---|---|
| *H01L 31/00* | (2006.01) | |
| *H01L 31/042* | (2006.01) | |
| *H01L 21/00* | (2006.01) | |

(52) U.S. Cl.
USPC .............. 136/248; 136/246; 136/253; 438/54

(58) Field of Classification Search
USPC ......................................................... 136/248
See application file for complete search history.

(56) References Cited

U.S. PATENT DOCUMENTS

| | | | | |
|---|---|---|---|---|
| 3,026,210 | A * | 3/1962 | Coble ............................ | 501/153 |
| 5,616,186 | A * | 4/1997 | Fraas et al. .................... | 136/253 |
| 5,651,838 | A * | 7/1997 | Fraas et al. .................... | 136/253 |
| 6,065,418 | A * | 5/2000 | Goldstein et al. ............. | 114/312 |
| 6,284,969 | B1 * | 9/2001 | Fraas et al. .................... | 136/253 |
| 2005/0121069 | A1 * | 6/2005 | Chou et al. .................... | 136/253 |

OTHER PUBLICATIONS

Fraas, L. et al., "Design of a Matched IR Emitter for a Portable Propane Fired TPV Power System" presented at TPV-9 conference in Valencia, Spain. Sep. 2010.

Fraas, L. et al., "Design and Thermal Modeling of a Portable Fuel Fired Cylindrical TPV Battery Replacement" presented at TPV-9 conference in Valencia, Spain. Sep. 2010.

* cited by examiner

*Primary Examiner* — Jennifer Michener
*Assistant Examiner* — Sadie White
(74) *Attorney, Agent, or Firm* — James Creighton Wray

(57) ABSTRACT

A compact power supply and battery substitute has a cylindrical wall with combustion air and cooling air fans at opposite ends. Air and fuel vapor flows through a mixing tube and an Omega recuperator to a combustion chamber and heats IR emitters spaced from TPV cells. An emitter post array or a catalytic matched emitter are heated by combustion. Exhaust is conducted through the recuperator that heats secondary air and fuel vapors and air in a mixing tube. Cooling air flows over fins radially extending from the TPV cells and past the recuperator and, mixes with exhaust from the recuperators and flows out of the housing past the combustion air fan. Fans are self-powered, and resulting electric power replaces batteries.

12 Claims, 14 Drawing Sheets

FIG. 3A Top View
FIG. 3B Side View
FIG. 3C Bottom View
FIG. 3D TPV Subassembly

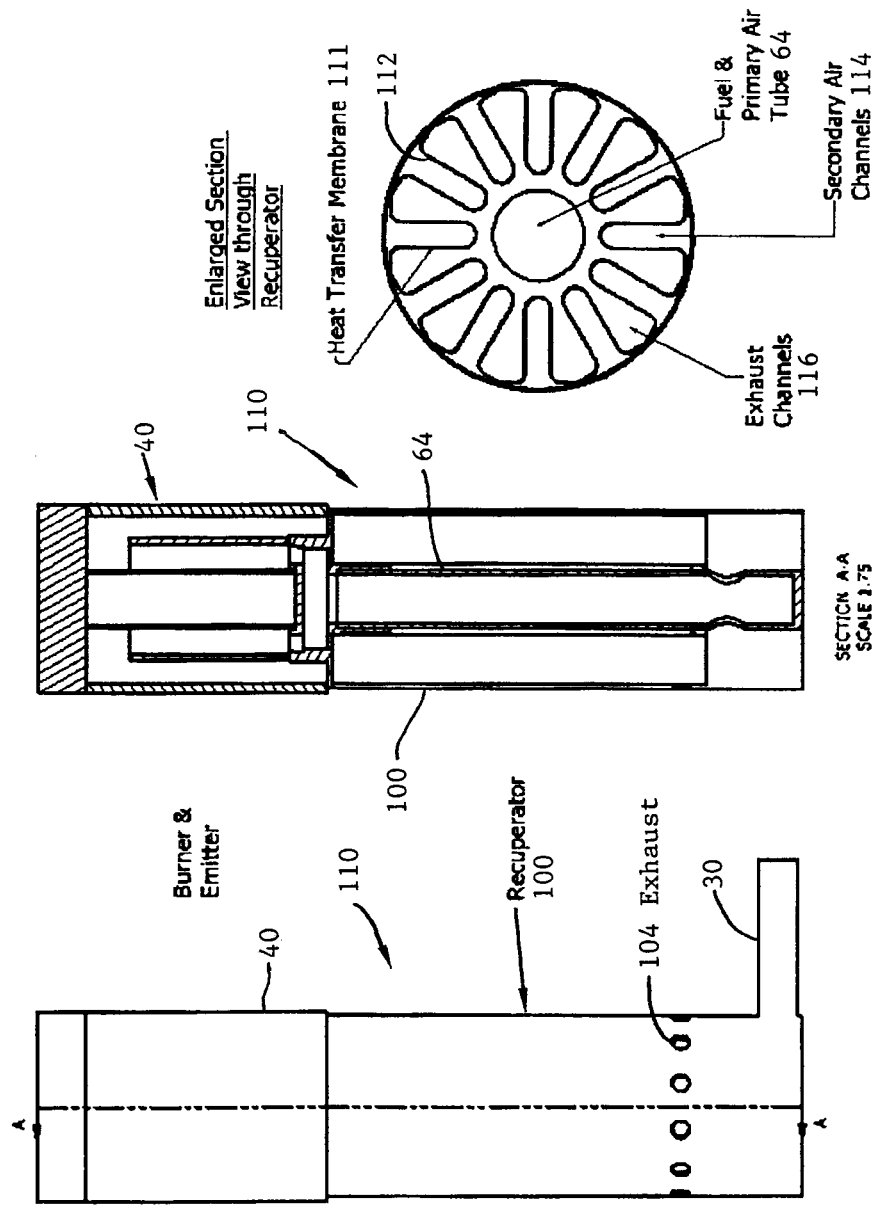

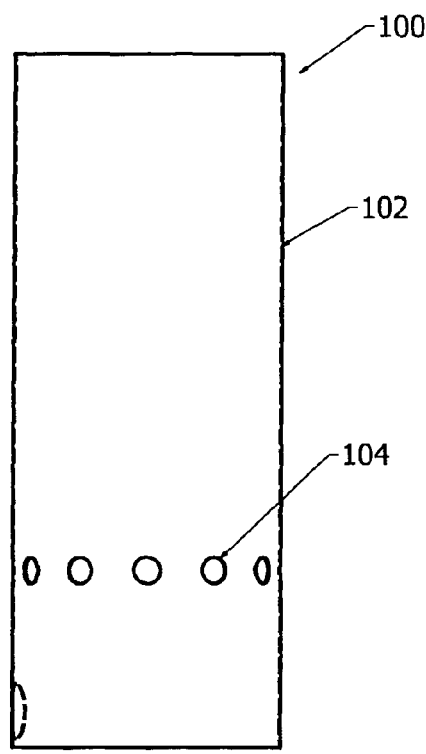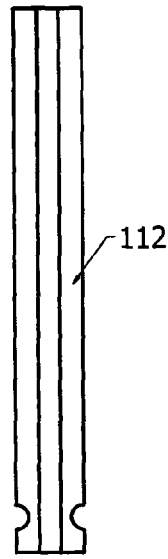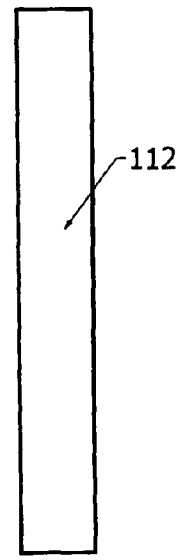
FIG. 7A
FIG. 7C　　FIG. 7D
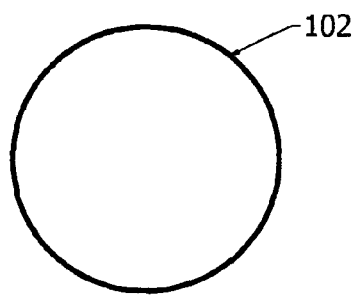
Cylindrical Sleeve
FIG. 7B
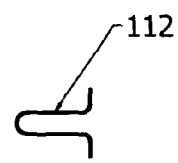
Omega HX Membrane (12 required)
FIG. 7E

Mixing Chamber Base & HX Top

Omega HX Disc

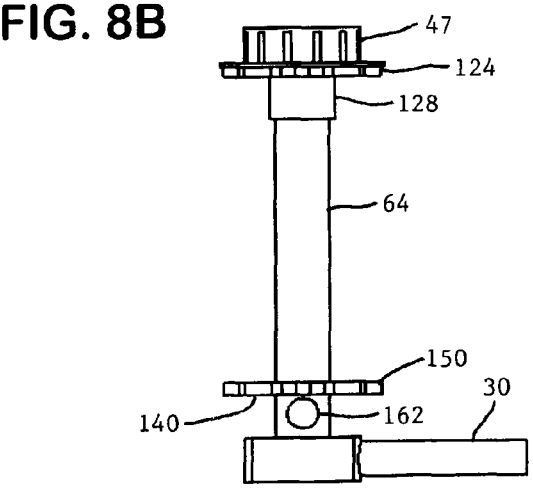
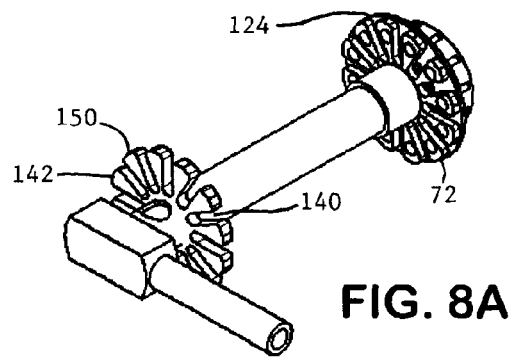
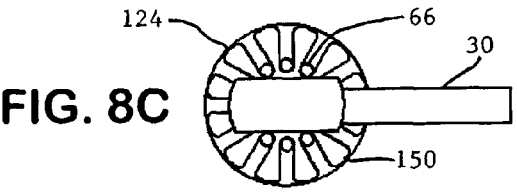
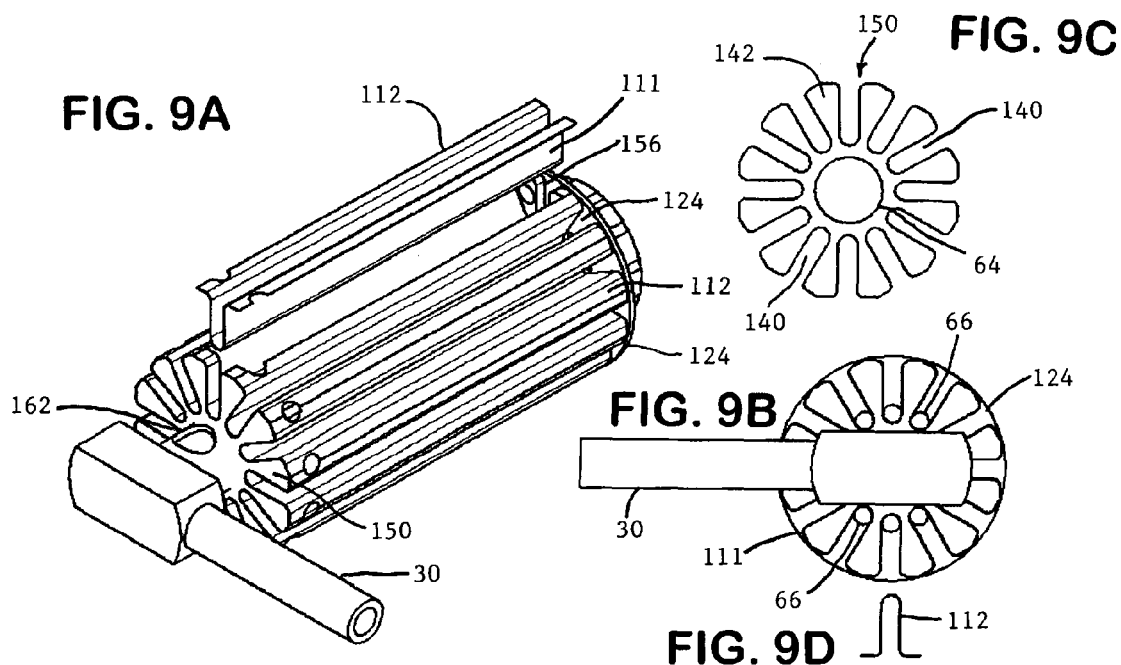

FUEL FIRED THERMOPHOTOVOLTAIC (TPV) CYLINDRICAL POWER SUPPLY AND BATTERY REPLACEMENT WITH CATALYTIC MATCHED EMITTER OR POST IR EMITTER ARRAY

This application claims the benefit of U.S. Provisional Application No. 61/395,618, filed May 14, 2010, U.S. Provisional Application No. 61/395,715, filed May 17, 2010 and U.S. Provisional Application No. 61/402,761, filed Sep. 3, 2010, which are hereby incorporated by reference in their entireties.

SUMMARY OF THE INVENTION

The lithium ion rechargeable battery proposed for use by the Army Land Warrior has a specific energy of 145 Wh/kg and weighs 1.1 kg. Meanwhile a hydrocarbon fuel such as butane has a specific energy of 12,900 Wh/kg. Therefore, given an efficient lightweight small chemical to electric converter, a much higher specific energy of over 1000 Wh/kg should be achievable.

More generally, there is a need for a lightweight compact electric generator that can replace the use of batteries in several potential applications. For example, refueling can be much faster than battery recharging.

JX Crystals Inc has been developing ThermoPhotoVoltaic (TPV) generators over the last several years. TPV generators are intrinsically lightweight. In a TPV generator, any fuel such as butane or JP8 can be used to heat a thin solid element until it glows in the infrared. Photovoltaic cells surrounding the IR emitter convert the radiation to DC electricity. The challenge for a TPV is conversion efficiency. However over the last several years, major improvements have been made in TPV converter components.

To first order, the conversion efficiency of a TPV system is given by the product of three terms: the chemical to radiation conversion efficiency, the percent of radiation in the cell convertible band known as spectral efficiency, and the cell conversion efficiency. In recent years, JX Crystals Inc has been making major improvements in all three of these subsystem efficiency areas.

The chemical to radiation conversion efficiency is based on the adiabatic flame temperature of approximately 2000° C. and our IR emitter target temperature of approximately 1200° C. Without provisions to manage the waste exhaust heat, the exhaust temperature would be 1200° C., and the system chemical to radiation conversion efficiency would only be (2000–1200)/2000° or 30%.

Two alternative compact TPV generators are described where the waste heat is used. A third embodiment is an extension of the second embodiment with two changes.

Fuel is injected through a metering valve orifice into a Bunsen burner like center coaxial tube. Combustion air is fed into a coaxial space around the fuel tube through a finned recuperator stage and into a fuel and air mixing chamber. A fuel/air swirling mixture is then injected into a combustion chamber and ignited. An IR emitter is located around the combustion chamber. A description of a possible IR emitter configuration follows. The outer wall of the combustion chamber may consist of a sapphire tube with an IR emitter coating on its inner surface. One possible IR emitter can be a tungsten film on the inner wall of the sapphire tube coated by a platinum film. The platinum film then serves both as a combustion catalyst and a protective coating for the tungsten IR emitter. Other IR emitter types are possible. For example, a post array IR emitter will be described. The flame heats the IR emitter to a target temperature of 1200° C. The combustion byproduct gases flowing initially in one direction are then turned around and then flow back around the outside of the emitter sapphire tube. These hot exhaust gases are confined by an outer sapphire or fused silica tube. TPV cells in circuits surround this combustion/emitter chamber forming the TPV converter section of this compact DC electric generator.

In the third embodiment, an improved catalytic matched emitter is used consisting of a sapphire tube with successive coatings of NiO (Nickel Oxide) and platinum (Pt). The NiO is a better more selective IR emitter material than tungsten with a higher emissivity matched to the response band of GaSb TPV cells. A second way the third embodiment differs from the second embodiment disclosed earlier is in the use of a novel Omega Recuperator replacing the TEG (thermoelectric) section in the second embodiment. All TPV configurations described here avoid the requirement for a vacuum enclosure around the IR emitter as has been required in some prior are designs.

These and further and other objects and features of the invention are apparent in the disclosure, which includes the above and ongoing written specification, with the claims and the drawings.

BRIEF DESCRIPTION OF THE DRAWINGS

FIGS. 6A and B are elevational and cross sectional views of a burner/emitter/recuperator.

FIG. 6C is a transverse cross sectional view of the recuperator.

FIGS. 7A-K show recuperator components.

FIGS. 8A-C show a recuperator in first stage assembly.

FIGS. 9A-D show a recuperator in second stage assembly.

DETAILED DESCRIPTION OF THE DRAWINGS

Figure 1:
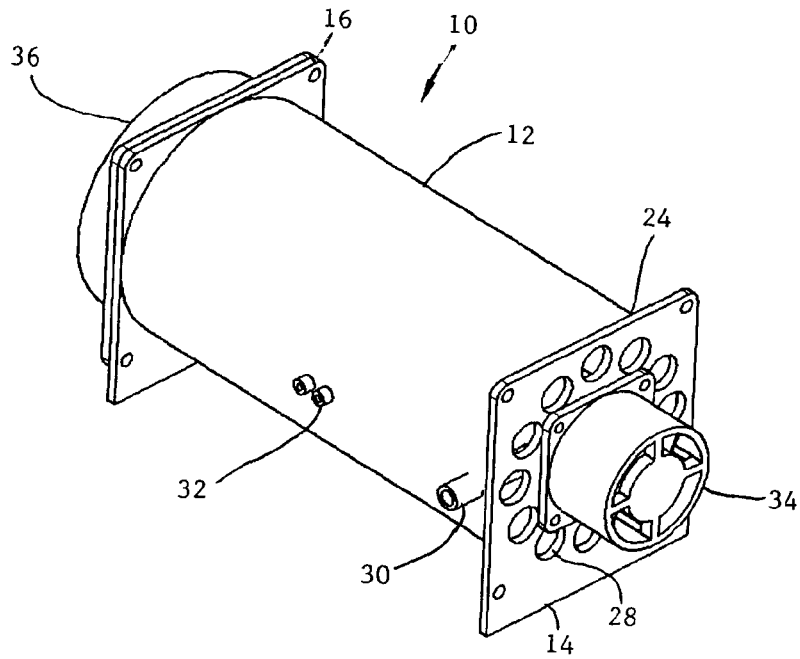
FIG. 1 is a perspective view of a compact cylindrical TPV generator.

FIG. 1 shows a perspective view of the compact cylindrical TPV generator 10. A cylinder 12 has mounting flanges 14 and 16 at its ends 24 and 26. Exhaust openings 28 extend through flange 14. A fuel inlet tube 30 is provided near end 24. Electric power outlets 32 are provided in the center of cylinder 12. Combustion air fan 34 is mounted on flange 14, and cooling air fan 36 is mounted on flange 16.

Figure 2:
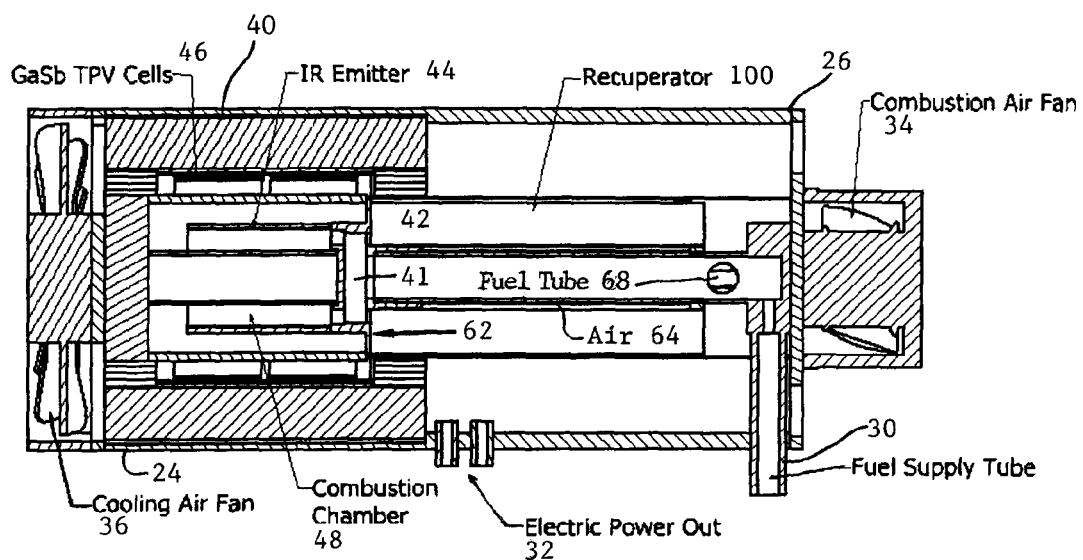
FIG. 2 is a labeled TPV generator cross sectional view.

FIG. 2 shows the major TPV cylinder components and subassemblies. There are combustion and cooling air fans 34, 36 at opposite ends 24, 26 of the cylinder 12. There are two subassemblies inside the cylinder: the TPV converter section 40 and the recuperator section 100. Fuel and air enters the cylinder, and DC electric power is produced and exits the cylinder.

The TPV converter section 40 has a burner 42, an IR emitter 44, and the TPV cell array 46. There is a fuel and air mixing chamber 41 at the entrance of the TPV converter section 40 and the hot end 62 of the recuperator 100. Combustion air from the combustion fan 34 is fed into the recuperator 100 through a plenum 90.

FIGS. 3A-D show the fuel & air mixing chamber 41, burner 42, novel IR emitter 44, and TPV array 46 in more detail.

The combustion chamber 48 between the IR emitter 44 and the inner sapphire tube 50 combusts hot gasses along the film catalytic layer 84 and the NiO emitting layer 82 in the matched IR emitter 44. The hot gases make a U turn at end 52 of the combustion chamber 48 and flow downward between the IR emitter 44 on inner sapphire tube 50 and the outer sapphire tube 54, further heating the emitter to produce IR radiation.

The GaSb TPV cell array 46 outside of the outer sapphire tube receives the IR radiation and produces DC electrical power that is removed through outlets 32 in the cylinder 12.

To keep the TPV cell array 46 at favorable temperature for producing power, fins 56 extend radially from the array 46. The cooling fan 36 blows air across the fins. The heated cooling air, leaving the fins 56, flows around the recuperator 100 and out through the holes 28 in the end plate 14. The recuperator 100 heats the combustion air blown through tube 64 and through the secondary air inlets 66 by the combustion air fan 34.

Fuel entering through fuel supply tube 30 flows axially through main fuel tube 68. The fuel, primary air from combustion air fan 34 and tube 64 and secondary air flowing through the recuperator mix in the mixing chamber 41.

FIG. 3A shows a top view of the TPV cell array 46 and the fins 56 which cool the cells.

FIG. 3B is a side view of the fins 56. FIG. 3C is a bottom view showing the TPV cell array 46, the cooling fins 56 and the recuperator 100. The fuel and primary air inlet 70 is shown in FIGS. 3C and 3D. The exhaust outlets 72 lead to the recuperator 100, which heats secondary combustion air flowing through the recuperator 100 as well as the primary air in tube 64 and fuel in tube 68.

Figure 4:
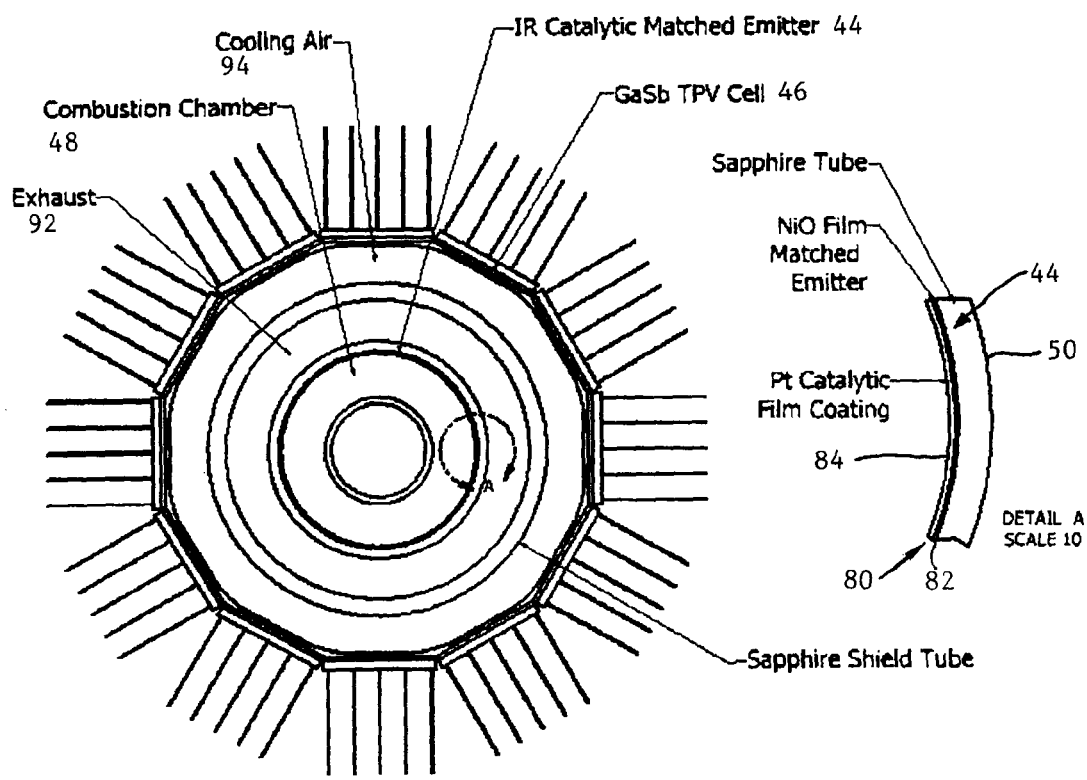
FIG. 4 is a cross sectional view of the IR emitter and TPV array.
Figure 5:
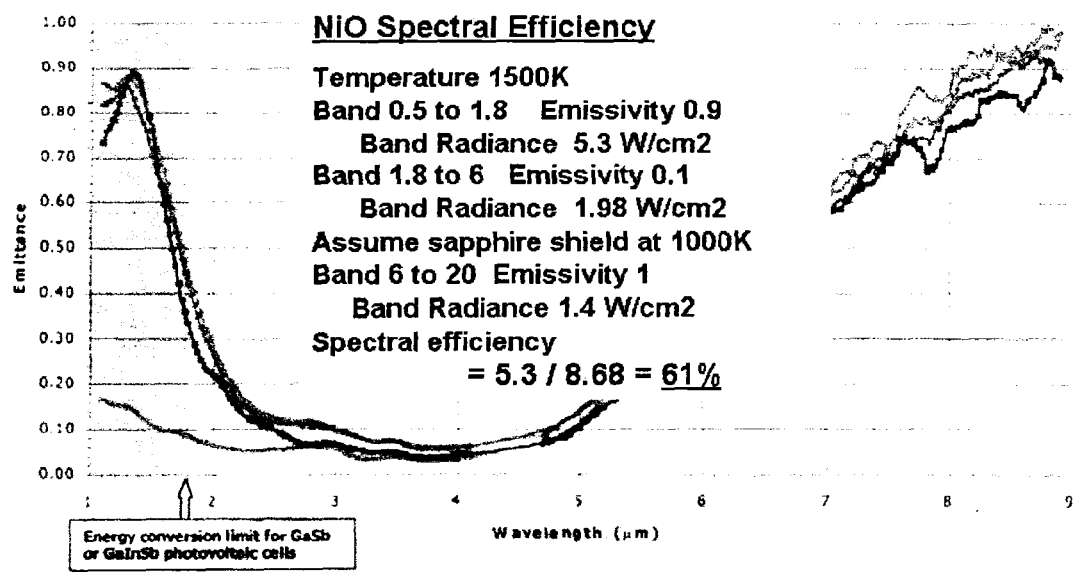
FIG. 5 shows emittance compared to wavelength in μm for a novel catalytic matched emitter.
Figure 7F:
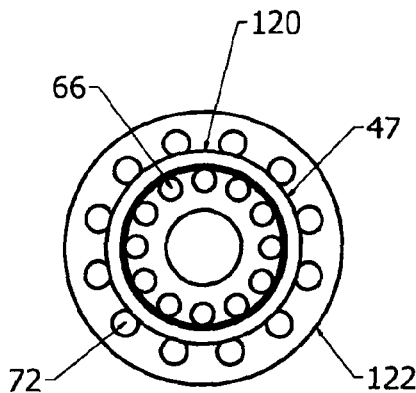
Figure 7I:
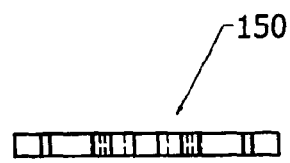
Figure 7G:
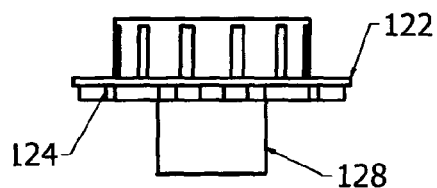
Figure 7J:
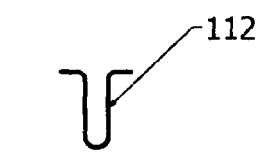
Figure 7H:
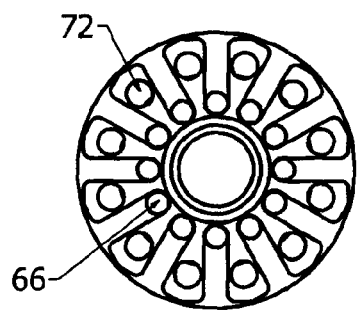
Figure 7K:
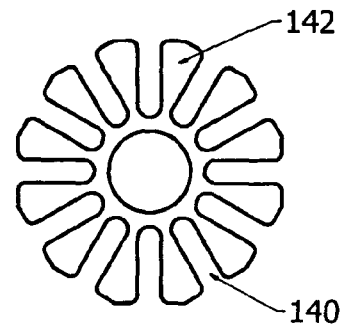

FIG. 4 highlights important features which are also novel elements. First is the use of sapphire tubes 50, 54. Sapphire tubes are now commercially available, and they are transparent out to 5.5 microns in the IR. This is important because they then have low IR emissivity out to 5.5 microns Another novelty is in the coating 80. The NiO coating 82 is on the inside of sapphire tube 50. As shown in FIG. 5, NiO has electronic transitions in the 1 to 1.8 micron spectral band. These electronic levels then emit IR radiation in this IR band and this IR band is well matched to the response band of GaSb or InGaAs/InP TPV cells 46. The NiO film 82 thickness should be optimized to between approximately 0.5 microns and 2 microns in order to produce an emissivity of approximately 0.9 in the 1 to 1.8 micron IR band, while maintaining a low emissivity in the 1.8 to 5.5 micron IR band. As shown in FIG. 5, when the NiO thickness is optimized, a spectral efficiency of 61% can be achieved.

A further novel element is the catalytic Pt coating 84 over the NiO emitter. This coating 84 serves two functions. It enhances the NiO emissivity for a given film thickness, and it serves as a catalyst so that the combustion occurs substantially on the solid surface, efficiently transferring the chemical energy from the fuel to the emitter such that combustion is complete in a small combustion volume.

An additional novel element is in the flow pattern around the outer sapphire tube 54 with exhaust flow 92 on its inside and with cooling air 94 on its outside. The intention here is to use the hot exhaust 92 to keep the emitter temperature at 1200° C. but at the same time to extract heat from the exhaust through this outer sapphire tube such that the exhaust temperature drops to 900° C. by the time it reaches and enters the recuperator 100. This then allows the recuperator to be constructed using readily available high temperature metals rather than ceramics.

FIG. 5 shows emittance compared to wavelength in μm for the NiO coating of the novel catalytic matched emitter.

The purpose of the novel Omega recuperator shown in FIG. 6 is to extract energy from the exhaust and to transfer that energy into the combustion air stream. Specifically, the goal is to reduce the exhaust temperature from 900° C. to 300° C. while increasing the combustion air temperature from 20° C. to 600° C. Using kT as a measure of energy, the chemical to radiation efficiency can then be increased to (2000−1200+900−300)/2000=1400/2000=70%.

The new burner/emitter/recuperator assembly 110 is shown in FIGS. 6A, 6B and 6C. The burner and emitter assembly 40 is mounted on top of the regenerator 100. The fuel tube 30 brings in fuel, and the recuperator 100 heats the fuel and air in the central tubes 64 and 68. Exhaust flows outward through outlets 104 in cylindrical sleeve 102.

The Omega recuperator section 100 is novel and uses Omega shaped sheet metal heat transfer elements 112 as shown in FIGS. 7, 8 and 9. FIG. 7 shows the parts that make up the recuperator 100. FIGS. 7A and 7B show the recuperator sleeve 102 with the exhaust outlets 104. FIGS. 7C, 7D and 7E show the side view, front view and cross section of the Omega shaped sheet metal heat transfer elements 112. FIGS. 7F, 7G and 7H are top, side and bottom views of the mixing chamber base 120 and heat exchanger top 122. A flower shaped disc 150 shown in FIGS. 7I and 7K supports the Omega shaped elements 112. FIG. 7J shows the Omega shaped elements 112 prior to insertion into an opening between the petals in disc 150. A flower shaped pattern 124 is also machined into the bottom of the mixing chamber base 120. Air inlets 66 and main tube 64 supply fuel and air into the mixing chamber 41. The short tube 128 fits over the end of the central tube 64. Exhaust outlet openings 72 in disc 120 lead to the exhaust chambers 16 in the recuperator 100. The small openings 66 in disc 120 admit to the mixing chamber 41 secondary air heated in air chambers 114 between the exhaust chambers 116 in the recuperator 100. An expanded cross section, through this recuperator is shown at the lower right in FIG. 6C. As shown in this cross section, twelve Omega-shaped sheet metal heat transfer elements 112 create alternating flow channels 114, 116 for the supply of secondary combustion air 114 and for the exhaust 116. Heat transfers through the walls of the Omega-shaped elements 112 as air flows in one direction and the exhaust flows in the opposite direction.

FIG. 7 shows the components that make up this heat exchanger recuperator 100. FIG. 8 shows the first stage of the recuperator assembly sequence. Referring to FIG. 8, there is a flower shaped disc 150 that fits over the fuel supply tube 64 and the base 120 of the mixing chamber fits over the open end of the fuel supply tube 64. FIG. 9 then shows the second stage of recuperator assembly. The Omega-shaped sheet metal heat transfer elements 112 then slip into the openings 140 between the petals 142 in the flower-shaped disc 150. One can now see the alternating air supply 114 and exhaust 116 channels. Referring to the drawing of the mixing chamber base on the left of FIG. 7H, one can see a cut out pattern 124 for the Omega HX elements 112 and two hole patterns. The inner 66 hole pattern mates with the air channels 114 and allows for the combustion air to enter the mixing chamber and then the combustion chamber. The outer hole pattern 72 allows for the exhaust to enter the recuperator exhaust channels 116. Recuperator assembly 100 is completed by placing a cylindrical sleeve 102 around the Omega elements 112. This sleeve 102 extends downward and mates to the combustion air fan 34. There is a radial hole pattern 104 in this sleeve 102 shown in FIGS. 6 and 7 that allows the exhaust to exit the sleeve and mix with the cooling air stream before the mixed air and exhaust exit through exhaust openings 28 shown in FIG. 1.

FIG. 8 shows a first assembly of the recuperator, connecting tube 64 to short tube 128. An air plenum 90 receives air blown in by combustion air fan 34. Large openings 162 flow the air into tube 64. A petal shaped lower plate 150 closes the exhaust channels 116. Openings 140 between petals 142 allow secondary combustion air to flow from plenum 90 into the secondary combustion air channels 114 and through the recuperator to openings 66 in the upper plate 120.

FIG. 9 shows the second step in assembling the recuperator 100. The membrane 111 is assembled with sections 112 placed on the petals 124 on the upper plate 120 and petals 142 on the lower plate 150.

Figure 10A:
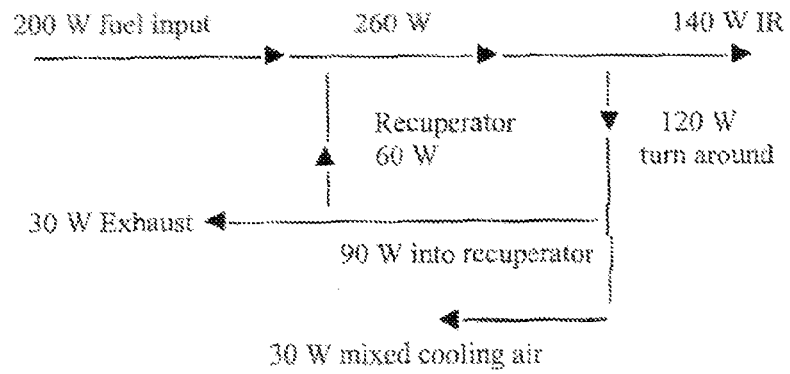
FIGS. 10A and B are energy flow diagrams for the portable TPV power supply and battery replacement.
Figure 10B:
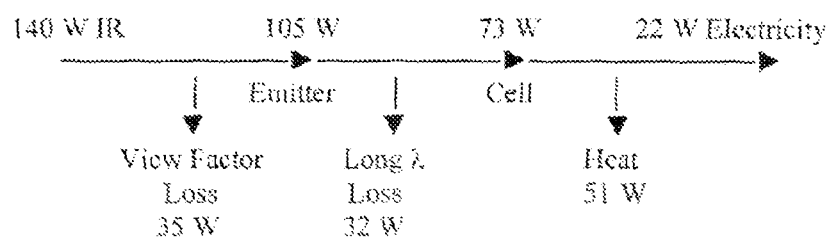

FIGS. 10A and 10B shows the energy flow diagram for the TPV unit described here. This unit is designed to consume fuel at a rate of 200 W. The upper section, FIG. 10A, shows the gas energy flow path. As described above, the recuperator is designed to recover 60 W from the exhaust stream and the combustion and emitter section is designed to deliver 140 W of IR radiation to the photovoltaic converter TPV array. Of the 200 W fuel energy input, 60 W will be lost in the combination of 30 W directly exiting in the exhaust from the recuperator and another 30 W transferred through the outer sapphire tube to the cooling air.

Figure 3:
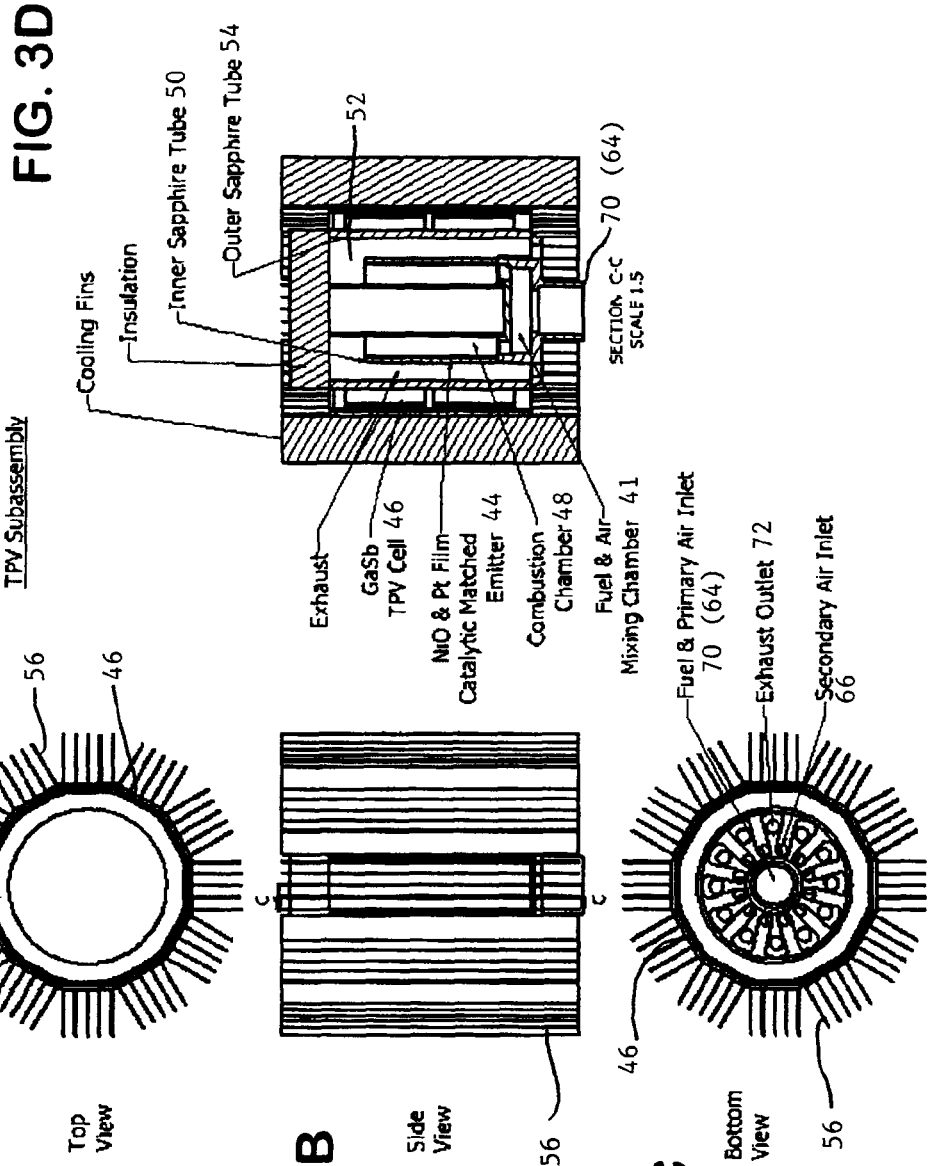
FIGS. 3A, B, C and D are top, side, bottom and cross sectional views of the mixing chamber/burner/emitter/TPV array.

The lower energy diagram in FIG. 10B shows the radiation energy flow. The first assumption here is that there is a long wavelength IR energy loss associated with spectral control as shown in FIG. 5. However, there is also a loss associated with the cell array to IR emitter view factor. As shown in FIGS. 2 and 3 but not mentioned earlier, we assume that the height of the PV array is larger than the height of the IR emitter in order to enhance this view factor. We assume here a view factor of 80%. In FIGS. 10A and 10B given these two radiation losses, we assume that 73 W of radiation in the cell convertible wavelength band is then delivered to the TPV cell array.

Finally in FIGS. 10A and 10B, the TPV cell array conversion efficiency is assumed to be 30%, implying that the TPV cell array will then produce 22 W. Assuming that the combustion and cooling air fans consume 2 W total, the TPV cylinder then generates 20 W and operates with a net energy conversion efficiency of 10%.

The weight of the TPV cylinder described here is about 200 g. The size of the TPV cylinder is 8 cm in diameter×18 cm long. Its volume then is 900 cc or 900 ml. In a parallel fuel cylinder of equal size and volume, the fuel cylinder will contain about 900 ml of fuel and weigh about 540 g.

The specific energy in a hydrocarbon fuel is 12,900 Wh/kg. So the energy in the 900 ml fuel cylinder above will be 6970 Wh. The weight of the TPV cylinder and the fuel cylinder combined will be 740 g. Given the TPV cylinder conversion efficiency of 10% just described, the converted energy available from the fuel will be 697 Wh. The specific energy for this TPV system will then be 697 Wh/0.74 kg=942 Wh/kg.

The lithium ion rechargeable battery proposed for use by the Army Land Warrior has a specific energy of 145 Wh/kg and weighs 1.1 kg. The TPV system described here is lighter and has a 942/145=6.5 times higher specific energy. The TPV system described here consumes fuel energy at a rate of 200 W. Given the fuel energy in the fuel tank just described, the TPV unit will run for 35 hours before the fuel in the fuel cylinder is consumed. The Land Warrior battery will have to be recharged after 5 hours of operation.

In conclusion, the TPV system described here is lighter than a Land Warrior battery, has 6.5 times higher specific energy, operates 7 times longer, and is much more rapidly refueled.

Figure 11:
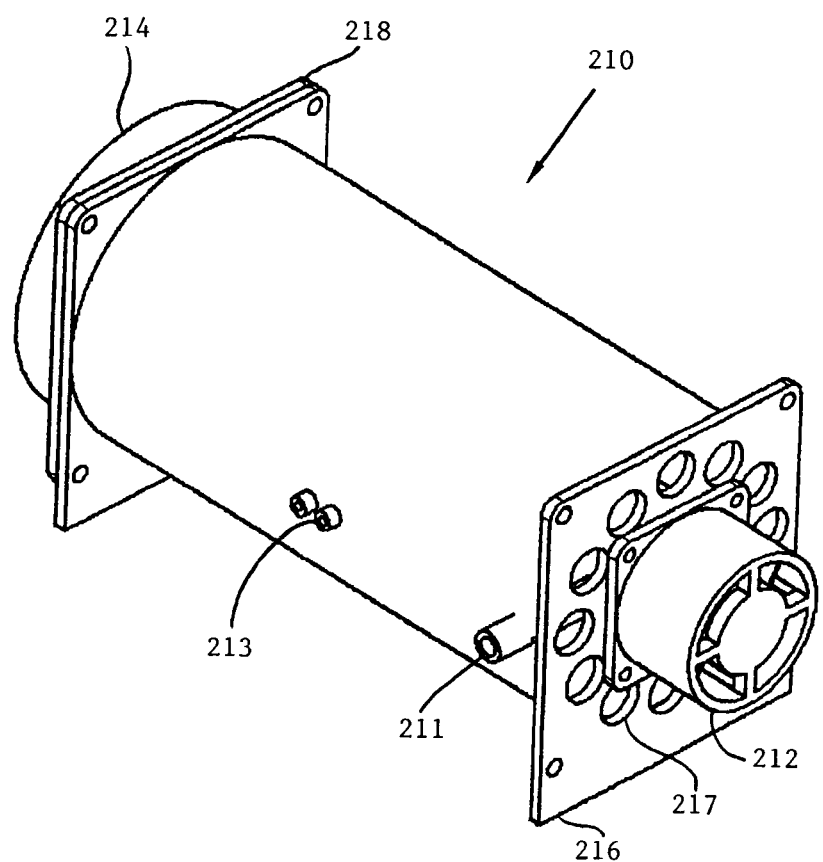
FIG. 11 is a perspective view of compact cylindrical thermophotovoltaic (TPV) generator.

The themmophotovoltaic (TPV) cylinder 210 shown in FIG. 11 has combustion and cooling air fans 212 and 214 at ends 216 and 218. Fan 214 drives cooling air through the cylinder 210 and out through openings 217 in end 216. There are two subassemblies inside the cylinder: the TPV converter section and the recuperator section. Fuel enters the cylinder through inlet 211, and DC electric power is produced and exits the cylinder through electrical connectors 213. The TPV converter section has of a photovoltaic converter section surrounding an infrared emitter. This invention describes improvements in the infrared emitter subassembly.

Figure 12:
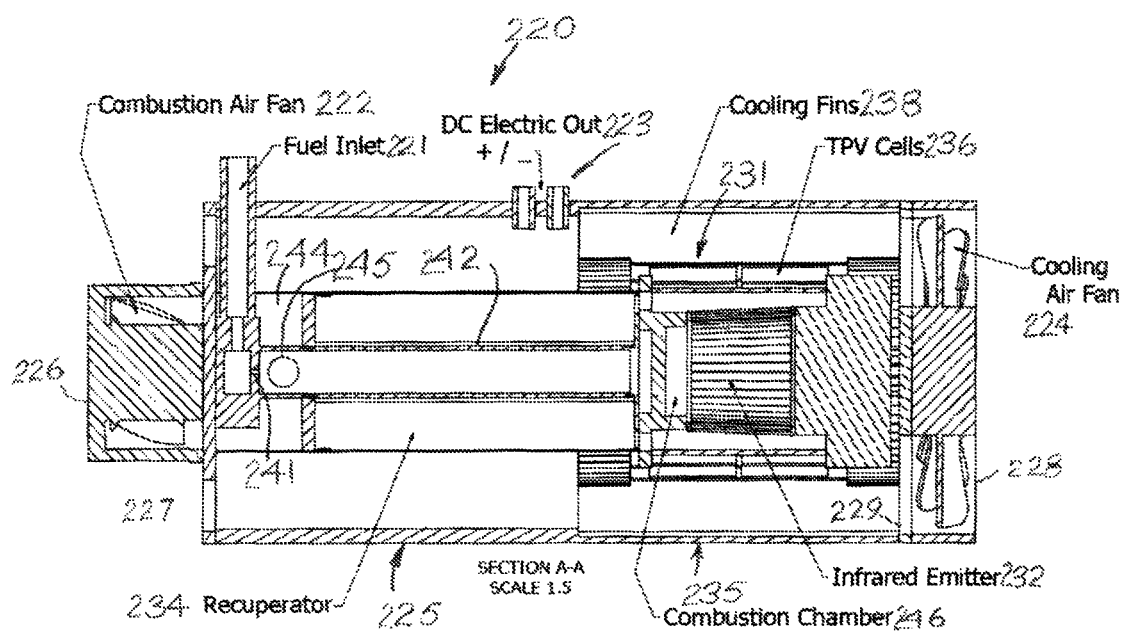
FIG. 12 shows a cross section through the TPV cylinder of the invention.

The TPV cylinder 220 shown in FIG. 12 has combustion and cooling air fans 222 and 224 at ends 226 and 228. Fan 224 drives cooling air through openings 229 in end 228, over cooling fins 238 on TPV cells 236 and past recuperator 234. Combustion exhaust gas from recuperator 234 mixes with the heated cooling air. Mixed cooling air and exhaust combustion gases flow outward through holes 227 in end 226. There are two subassemblies inside the cylinder: the TPV converter section 235 and the recuperator section 225. Fuel enters the cylinder through inlet 221, and DC electric power is produced and exits the cylinder through electrical connectors 223. The TPV converter section 230 has of a photovoltaic converter section 231 surrounding an infrared emitter 232. This invention describes improvements in the infrared emitter subassembly 232.

FIG. 12 shows a cross section through the TPV cylinder 220 of this invention including the improvements in the infrared emitter 232. This TPV cylinder is similar to the unit described in FIG. 11 except for improvements in the IR emitter 232. As shown in FIG. 12, the emitter subassembly 232 sits on top of the recuperator subassembly 234. Emitter 232 is surrounded by the air cooled TPV cell array 236.

Cooling fins 238 surround the TPV cell array 236. The cooling fan 224 blows cooling air through openings 229 in end 228 and through the cooling fins 238. Cooling air heated by fins 238 entrains and cools hot combustion exhaust gases from the recuperator 234.

Fuel flows through fuel inlet 221 and orifice 241 into mixing tube 242. Combustion air is driven by fan 222 through chamber 244 and openings 245 into mixing tube 242. The fuel air mixture ignites in hot combustion chamber 246. The hot combustion gases heat the infrared emitter 232 and are exhausted through the emitter to further heat the emitter and then through the recuperator 234 to preheat the fuel air mixture in mixing tube 242.

There are three requirements for a good IR emitter a fuel fired TPV generator. These requirements are as follows:

1) The IR emitter needs to have the appropriate, chemical composition such that it emits infrared radiation with wavelengths matched to the response band of the TPV cells.

2) The IR emitter geometry must be such that it efficiently extracts energy from the combustion gases passing through and around it.

3) The IR emitter needs to be easily fabricated.

Figure 13:
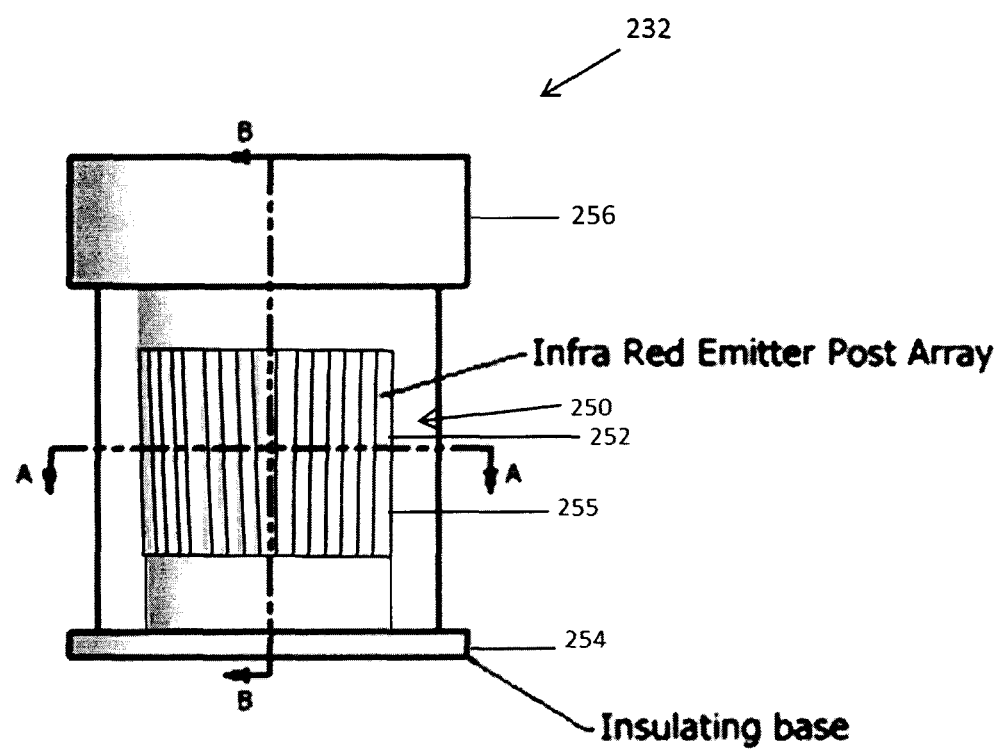
FIG. 13 shows a side view of the infrared emitter shown in FIG. 12.

FIG. 13 shows the side view of the infrared emitter of the present invention.

The FIG. 13 side view of the infrared emitter assembly 232 shows the cylindrical array 250 of tilted IR emitter posts 252. The IR emitter posts 252 are heated uniformly and glow, producing IR radiation. The emitter 232 has an insulating base 254 and an insulating lid 256.

Figure 14:
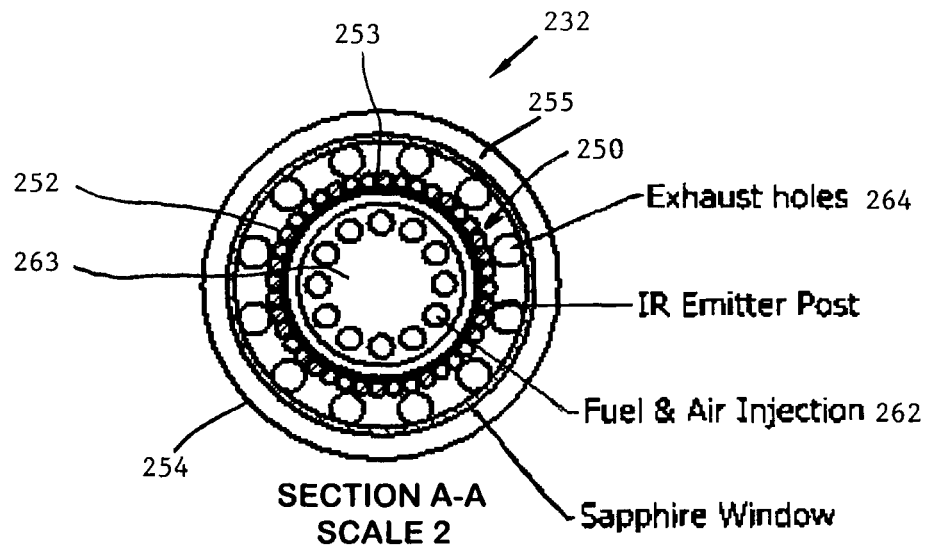
FIG. 14 shows Section A-A through emitter assembly shown in FIG. 13.
Figure 15:
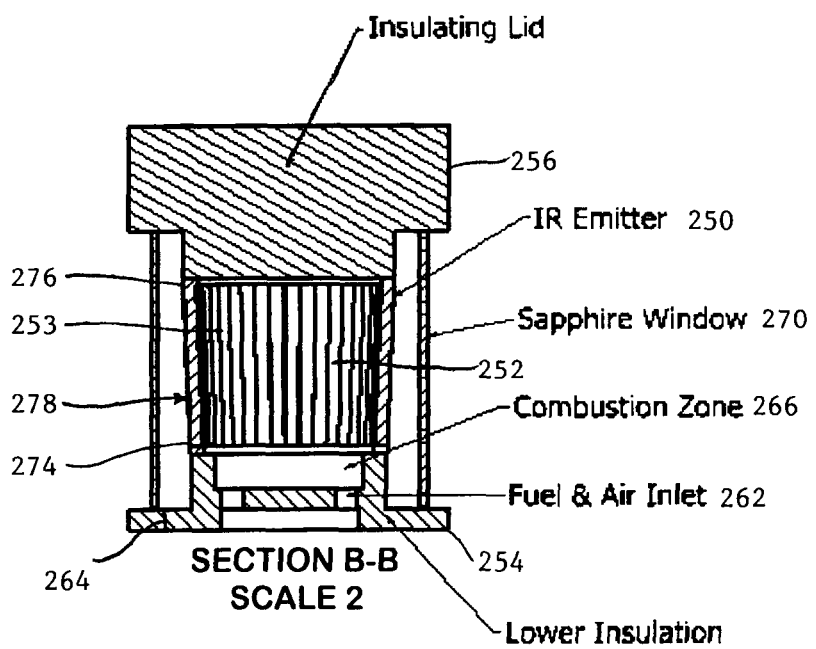
FIG. 15 shows Section B-B through emitter assembly shown in FIG. 13.

Section cuts A-A and B-B in FIG. 13 show locations of FIGS. 14 and 15 cross sections. FIG. 14 shows Section A-A through emitter assembly. FIG. 15 shows Section B-B through emitter assembly.

As shown in FIGS. 14 and 15, the IR emitter assembly 232 has of a lower insulating plate 254 with a top 255 and an internal shelf. Fuel and air injection holes 262 are provided in a plate 263 formed from the inner shelf of the lower insulating plate 254. Exhaust gas exit holes 264 are formed in insulating plate 254. There is an array 250 of emitter posts 252 on top 255 of this insulating plate 254 with a combustion chamber 266 inside this array 250. The emitter posts 252 are cylindrical or polygonal with a diameter of approximately 1 to 2 mm. The hot exhaust gases exit through small slits 253 between these IR emitter posts 252. The slit widths are approximately 0.1 to 0.2 mm. There is an insulating lid 256 on top of this emitter post array 250.

A sapphire or fused silica transparent window 270 surrounds this IR emitter post array 250. The window 270 transmits IR radiation from the emitter post array 250 to the TPV cell array 236.

Because entry 262 and exit holes 264 for both the fuel air mixture and the exhaust are in the bottom plate 254, there is a tendency for the lower end 274 of the emitter array 250 to run hotter than the upper end 276 of the emitter array 250, unless the post array 250 is tilted 278 as shown. This tilt 278 increases the slit 253 widths between the emitter posts 252 toward the top end 276, enhancing the flow of hot combustion gases and the heat transfer rate at the top 276 to promote more emitter temperature uniformity from top 276 to bottom 274 of the emitter post array 250.

The three emitter design criteria enumerated above are now addressed in succession.

The emitter rods 252 need to have the appropriate chemical composition such that they emit infrared radiation with wavelengths matched to the response band of the TPV cells 236.

Appropriate TPV cells are either GaSb or InGaAs/InP or Ge cells that convert heat to radiation with wavelengths less than approximately 1.8 microns into electricity. The infrared emitter ideally should only emit radiation with wavelengths less than 1.8 microns. If infrared wavelengths longer than 1.8 microns are emitted, the longer wavelength radiation will produce only unwanted heat in the TPV cells. It has been shown that Ni or Co ions in an oxide matrix emit radiation in the 1 to 1.8 micron wavelength range. Appropriate IR emitter posts 252 for this invention have these ions incorporated as impurities in oxide ceramics such as alumina ($Al2O3$, including sapphire), magnesia (MgO), or Spinel ($MgAl2O4$).

The emitter geometry must be such that it efficiently extracts energy from the combustion gases passing through and around it.

The post array 250 emitter geometry is a key difference. Computational fluid dynamics (CFD) calculations have been performed on the emitter geometry shown here in FIGS. 12, 13, 14, and 15. These calculations are summarized in Table 1 and FIG. 16. These calculations show that the emitter posts 252 rod diameter and rod spacing are important for heat transfer. Furthermore, the calculations show that catalytic reactions are not required for efficient heat transfer. This data shows that the gas temperature drops from 2400° C. to 1180° C. as it passes through the emitter post array 250 leaving the emitter solid temperature at approximately 1180° C., suggesting that over 50% of the energy in the gas is extracted as radiation.

Figure 16:
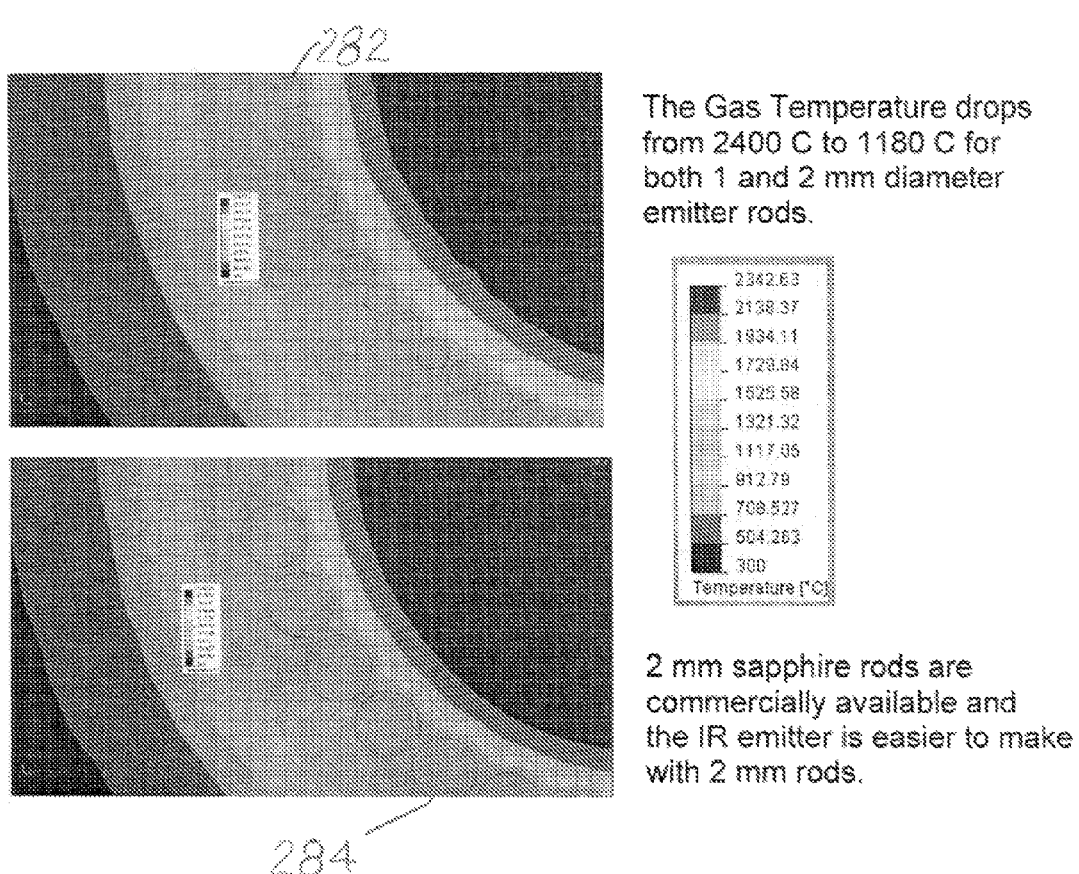
FIG. 16 shows gas temperature profiles for post emitter arrays shown in FIGS. 12-15.

FIG. 16 shows CFD gas temperature profiles for post emitter arrays.

The emitter should be easy to fabricate.

As noted in FIG. 16, the gas temperature drops from 2400° C. to 1180° C. for both 1 and 2 mm diameter emitter rods, 282, 284. 2 mm sapphire rods are commercially available, and the IR emitter 250 is easy to make with 2 mm rods. Sapphire or alumina ceramic, rods are commercially available in the 1 to 2 mm diameter range. These rods can be cut to length, and the appropriate number can be placed in grooves with the appropriate diameter in the top 256 and bottom 254 insulator discs. Spacings 253 can be set between the rods by interweaving a wire of the appropriate diameter between the rods 252 in the array 250, with one wire weave at the top of the array and a second wire weave at the bottom of the array. For example, if a 0.1 mm spacing is required, a 0.1 mm wire can be used.

It may be most desirable to have the rods doped with the appropriate impurity ions when the rods are fabricated. It is also possible to coat the ceramic rods as received with, for example, a Nickel film and then to fire the rods to create a doped surface emitter layer of, for example, $NiAl_2O_4$.

TABLE 1

CFD calculation results for emitter post arrays shown in FIG. 6

|  | 1 mm rods | 2 mm rods |  |
| --- | --- | --- | --- |
| Temp Solid | 11030-1267, 1195 avg | 1078-1248, 1177 avg | ° |
| Net Radiation | 214 | 219 | W |
| Area | 55.76 | 59.56 | $cm^2$ |
| Pressure | 101328-101338, 101333 avg | 101327-101337, 101332 avg | Pa |
| Radiation Flux | −2.6 to 8.63, 3.95 avg | −3.26 to 7.91, 3.72 avg | $W/cm^2$ |
| Mass Flow | 1.40E−04 | 1.40E−04 | kg/s |
| Flow Source Temp | 2400 | 2400 | ° |
| Rod spacing | 0.1 mm | 0.2 mm |  |
| Emitter OD/ID | 26 mm/24 mm | 28 mm/24 mm |  |
| Emitter height | 23 mm | 23 mm |  |

While the invention has been described with reference to specific embodiments, modifications and variations of the invention may be constructed without departing from the scope of the invention, which is defined in the following claims.

The invention claimed is:

1. Apparatus comprising:
a compact power supply further comprising:
a housing,
a combustion air fan connected to the housing,
a combustion air inlet connected to the combustion air fan,
a mixing tube connected to the combustion air inlet,
a fuel supply tube connected to the mixing tube in the housing,
a combustion chamber connected to the mixing tube in the housing,
an infrared emitter assembly surrounding the combustion chamber, an exhaust chamber surrounding the infrared emitter assembly,
an outer infrared transmitting tube surrounding the exhaust chamber,
thermophotovoltaic cells surrounding the outer infrared transmitting tube,
an Omega-shaped recuperator connected to the exhaust chamber,
a cooling chamber surrounding the thermophotovoltaic cells and the recuperator,
a cooling air fan blowing cooling air through the cooling chamber, across the thermophotovoltaic cells, and through the recuperator,
an exhaust outlet connected to the recuperator and the cooling chamber,
combined cooling air and exhaust outlets connected to the cooling chamber and the housing,
wherein the infrared emitter assembly comprises an annular array of adjacent infrared emitter posts,
wherein the infrared emitter posts are separated by narrow slits, and
wherein the infrared emitter posts are tilted outwardly and the slits are wider in a first direction toward the cooling air fan and the slits are narrower in a second direction toward the combustion air fan.

2. The apparatus of claim 1, wherein the housing is cylindrical and the cooling chamber is positioned immediately inside an outer wall of the housing, keeping the housing cool.

3. The apparatus of claim 1, wherein the mixing tube is elongated and is in elongated contact with the recuperator for preheating the combustion air and fuel vapors in the mixing tube.

4. The apparatus of claim 3, wherein the exhaust is in contact with an outer wall of the mixing tube.

5. The apparatus of claim 4, wherein the recuperator comprises an outer wall separating the cooling chamber from the exhaust in the recuperator.

6. The apparatus of claim 5, wherein the Omega-shaped recuperator outer wall is fluted, forming recuperator portions of large radii separated by portions of small radii, and wherein exhaust ports from the exhaust chamber communicate with portions of large radii, and wherein exhaust outlets from the recuperator to the cooling chamber are in the portions having large radii, and further comprising passage ways for secondary combustion air passing along the portions of small radii, and conducting heated secondary combustion air to secondary combustion air inlets in the combustion chamber.

7. Apparatus comprising:
a compact power supply further comprising:
a housing,
a combustion air fan connected to the housing,
a combustion air intake connected to the combustion air fan,
a mixing tube connected to the combustion air intake,
a fuel supply tube connected to the mixing tube in the housing,
a combustion chamber connected to the mixing tube in the housing,
an infrared emitter assembly surrounding the combustion chamber,
an exhaust chamber surrounding the infrared emitter assembly,
an outer infrared transmitting tube surrounding the exhaust chamber,
thermophotovoltaic cells surrounding the outer infrared transmitting tube,
an Omega-shaped recuperator connected to the exhaust chamber,
a cooling chamber surrounding the thermophotovoltaic cells and the recuperator,
a cooling air fan blowing cooling air through the cooling chamber, across the thermophotovoltaic cells, and through the recuperator,
an air intake connected to the combustion air fan and to the mixing tube,
exhaust outlets connected to the recuperator and the cooling chamber, and
combined cooling air and exhaust outlets connected to the housing near the combustion air fan,
wherein the infrared emitter assembly comprises an annular array of adjacent infrared emitter posts,
wherein the infrared emitter posts are separated by narrow slits, and
wherein the infrared emitter posts are tilted outwardly and the slits are wider in a first direction toward the cooling air fan and the slits are narrower in a second direction toward the combustion air fan.

8. The apparatus of claim 7, wherein the infrared emitter assembly further comprises an insulating base and an insulating lid with the infrared emitter posts enclosing the combustion chamber, the insulating base having fuel and air openings from the mixing tube to the combustion chamber, and the insulating lid having exhaust outlets from the combustion chamber to the exhaust chamber.

9. The apparatus of claim 1, wherein the outer infrared transmitting tube is an outer sapphire tube surrounding the exhaust chamber.

10. The apparatus of claim 7, further comprising heat exchange fins extending from the thermophotovoltaic cells into the cooling chamber.

11. A method comprising:
providing a compact power supply further comprising:
providing a housing,
providing a combustion air fan connected to the housing,
providing a combustion air inlet connected to the combustion air fan,
providing a mixing tube connected to the combustion air inlet,
providing a fuel supply tube connected to the mixing tube in the housing,
providing a combustion chamber connected to the mixing tube in the housing,
providing an infrared emitter assembly surrounding the combustion chamber,
providing an exhaust chamber surrounding the infrared emitter assembly,
providing an outer infrared transmitting tube surrounding the exhaust chamber,
providing thermophotovoltaic cells surrounding the outer infrared transmitting tube,
providing a recuperator connected to the exhaust chamber,
providing a cooling chamber surrounding the thermophotovoltaic cells and the recuperator,
providing a cooling air fan and blowing cooling air through the cooling chamber, across the thermophotovoltaic cells, and through the recuperator,
providing an exhaust outlet connected to the recuperator and the cooling chamber, and
providing combined cooling air and exhaust outlets connected to the cooling chamber and the housing,
wherein the infrared emitter assembly comprises an annular array of adjacent infrared emitter posts, wherein the infrared emitter posts are separated by narrow slits,
wherein the infrared emitter posts are tilted outwardly and the slits are wider in a first direction toward the cooling air fan and the slits are narrower in a second direction toward the combustion air fan.

12. The method of claim 11, further comprising providing secondary combustion air channels.

\* \* \* \* \*